United States Patent
Kido

(10) Patent No.: US 11,936,977 B2
(45) Date of Patent: Mar. 19, 2024

(54) CONTROL APPARATUS, CONTROL METHOD, AND A NON-TRANSITORY COMPUTER READABLE MEDIUM

(71) Applicant: JVCKENWOOD Corporation, Yokohama (JP)

(72) Inventor: Takeshi Kido, Yokohama (JP)

(73) Assignee: JVCKENWOOD CORPORATION, Yokohama (JP)

(*) Notice: Subject to any disclaimer, the term of this patent is extended or adjusted under 35 U.S.C. 154(b) by 363 days.

(21) Appl. No.: 17/339,045

(22) Filed: Jun. 4, 2021

(65) Prior Publication Data
US 2021/0297578 A1  Sep. 23, 2021

Related U.S. Application Data

(63) Continuation of application No. PCT/JP2020/008870, filed on Mar. 3, 2020.

(30) Foreign Application Priority Data

Mar. 25, 2019 (JP) .................................. 2019-056623

(51) Int. Cl.
H04N 23/66 (2023.01)
H04N 23/51 (2023.01)
(Continued)

(52) U.S. Cl.
CPC ............. *H04N 23/66* (2023.01); *H04N 23/51* (2023.01); *H04N 23/62* (2023.01); *H04N 23/695* (2023.01); *H04N 23/90* (2023.01)

(58) Field of Classification Search
CPC ........ H04N 23/66; H04N 23/51; H04N 23/62; H04N 23/695; H04N 23/90; G08C 17/02
See application file for complete search history.

(56) References Cited

U.S. PATENT DOCUMENTS

| 8,879,886 B2* | 11/2014 | de Klerk ............ H04N 5/76 386/223 |
| 2006/0061664 A1* | 3/2006 | Ito ................. H04N 23/695 348/E5.042 |

(Continued)

FOREIGN PATENT DOCUMENTS

| EP | 3618429 A1 | 3/2020 |
| JP | 2005-203874 A | 7/2005 |
| JP | 2019009766 A | 1/2019 |

*Primary Examiner* — Gevell V Selby
(74) *Attorney, Agent, or Firm* — Procopio, Cory, Hargreaves & Savitch LLP

(57) ABSTRACT

A control apparatus according to an aspect of the present invention includes a controlled-object selecting switch configured to select an object to be controlled from a plurality of objects to be controlled and switch the object to be controlled to the selected one, an adjustment-value changing operation unit configured to change an adjustment value indicating an adjustment amount for each of the objects to be controlled, a control unit configured to make the selected object to be controlled adjust the adjustment amount by transmitting, to the selected object to be controlled, an adjustment-value changing command for adjusting the adjustment amount to the one indicated by the adjustment value, and a storage unit configured to store, when the object to be controlled is switched by the controlled-object selecting switch, a pre-switching adjustment value, in which when the object to be controlled is switched by the controlled-object selecting switch.

5 Claims, 8 Drawing Sheets

(51) Int. Cl.
*H04N 23/62* (2023.01)
*H04N 23/695* (2023.01)
*H04N 23/90* (2023.01)

(56) References Cited

U.S. PATENT DOCUMENTS

| | | | |
|---|---|---|---|
| 2013/0300892 A1* | 11/2013 | Nagamasa | H04N 23/88 |
| | | | 348/223.1 |
| 2014/0267814 A1* | 9/2014 | Matsuo | H04N 23/661 |
| | | | 348/211.11 |
| 2018/0227499 A1* | 8/2018 | Lee | H04N 23/633 |

\* cited by examiner

US 11,936,977 B2

CONTROL APPARATUS, CONTROL METHOD, AND A NON-TRANSITORY COMPUTER READABLE MEDIUM

CROSS REFERENCE TO RELATED APPLICATION

This application is a Bypass Continuation of PCT/JP2020/008870 filed on Mar. 3, 2020, which is based upon and claims the benefit of priorities from Japanese patent application No. 2019-056623, filed on Mar. 25, 2019, the disclosure of which are incorporated herein in its entirety by reference.

BACKGROUND

The present invention relates to a control apparatus, a control method, and a control program.

Patent Literature 1 (Japanese Unexamined Patent Application Publication No. 2005-203874) discloses that an image-pickup condition for a camera is remotely controlled by a control apparatus. The amount of an adjustment for an object to be controlled is controlled by a dedicated control apparatus. In particular, a critical adjustment is required for the brightness of an image taken by a camera. Therefore, as means for adjusting the brightness of the image, an adjustment using an adjustment-value changing lever by which an adjustment is made according to its physical position is desired.

SUMMARY

In recent years, in order to reduce the total cost of a system, it has been desired to control a plurality of objects to be controlled by using one control apparatus. When a plurality of objects to be controlled are controlled by one control apparatus, the control apparatus is equipped with a controlled-object switching switch, so that an object to be controlled is selected by the controlled-object switching switch and an adjustment is made for the selected object to be controlled. However, in the adjustment using the operation lever, the adjustment value is determined based on the physical position of the operation lever. Therefore, if the adjustment using the adjustment-value changing lever is effective at the time when the object to be controlled is switched, there is a possibility that the adjustment value for the newly-selected object to be controlled becomes an unintended value.

In order to prevent such a situation, the following product has been made commercially available. That is, the product is equipped with a movable device such as a motor incorporated into its adjustment-value changing lever, so that the product has a function of moving the adjustment-value changing lever to a position for an adjustment value for the selected object to be controlled. In this method, however, there are significant problems that the control of the position is complicated and the cost is increased due to the incorporation of the movable part.

Further, it is also conceivable, in order to prevent an adjustment value from being changed at the time of switching, to employ a method in which, when a plurality of objects to be controlled are used, an adjustment by the adjustment-value changing lever is disabled and an adjustment by a separately-provided rotary encoder having no absolute position is enabled. There are products that prevent the above-described situation by using the above-described method. However, the above-described method is a solution that is achieved through the operation, so that it is impossible to change an adjustment value according to user's preference by using the "lever".

In view of the above-described problems, the present invention provides a control apparatus, a control method, and a control program capable of preventing an adjustment amount from being changed at the time when an object to be controlled is switched.

An embodiment provides a control apparatus including: a controlled-object selecting switch configured to select a specified object to be controlled from a plurality of objects to be controlled and switch the object to be controlled to the selected one; an adjustment-value changing operation unit configured to change an adjustment value indicating an adjustment amount for each of the plurality of objects to be controlled; a control unit configured to make the selected specified object to be controlled adjust the adjustment amount by transmitting, to the selected specified object to be controlled, an adjustment-value changing command for adjusting the adjustment amount to the one indicated by the adjustment value; and a storage unit configured to store, when the object to be controlled is switched from the specified object to be controlled to an object to be controlled other than the specified object to be controlled by the controlled-object selecting switch, a pre-switching adjustment value indicating the adjustment amount before the switching of the specified object to be controlled, in which when the object to be controlled is switched from the object to be controlled other than the specified object to be controlled to the specified object to be controlled by the controlled-object selecting switch, the control unit starts, after the adjustment-value changing operation unit indicates the pre-switching adjustment value, transmitting the adjustment-value changing command to the specified object to be controlled, and thereby makes the specified object to be controlled adjust the adjustment amount to the one indicated by the adjustment value.

An embodiment provides a control method including: a step of selecting, by using a controlled-object selecting switch configured to select a specified object to be controlled from a plurality of objects to be controlled and switch the object to be controlled to the selected one, the specified object to be controlled and switching the object to be controlled to the selected one; a step of changing, by using an adjustment-value changing operation unit configured to change an adjustment value indicating an adjustment amount for each of the plurality of objects to be controlled, the adjustment value indicating the adjustment amount for the specified object to be controlled; a step of making the selected specified object to be controlled adjust the adjustment amount by transmitting, to the selected specified object to be controlled, an adjustment-value changing command for adjusting the adjustment amount to the one indicated by the adjustment value; a step of storing, when the object to be controlled is switched from the specified object to be controlled to an object to be controlled other than the specified object to be controlled by the controlled-object selecting switch, a pre-switching adjustment value indicating the adjustment amount before the switching of the specified object to be controlled; and a step of starting, when the object to be controlled is switched from the object to be controlled other than the specified object to be controlled to the specified object to be controlled by the controlled-object selecting switch, and after the adjustment-value changing operation unit indicates the pre-switching adjustment value, transmitting the adjustment-value changing command to the specified object to be controlled, and thereby making the specified object to be controlled adjust the adjustment amount to the one indicated by the adjustment value.

An embodiment provides a control program for causing a computer to, when a specified object to be controlled is selected and the object to be controlled is switched to the selected one by a controlled-object selecting switch configured to select the specified object to be controlled from a plurality of objects to be controlled and switch the object to be controlled to the selected one, and an adjustment value indicating an adjustment amount for the specified object to be controlled is changed by an adjustment-value changing operation unit configured to change the adjustment value indicating the adjustment amount for each of the plurality of objects to be controlled, make the selected specified object to be controlled adjust the adjustment amount by transmitting, to the selected specified object to be controlled, an adjustment-value changing command for adjusting the adjustment amount to the one indicated by the adjustment value; store, when the object to be controlled is switched from the specified object to be controlled to an object to be controlled other than the specified object to be controlled by the controlled-object selecting switch, a pre-switching adjustment value indicating the adjustment amount before the switching of the specified object to be controlled; and start, when the object to be controlled is switched from the object to be controlled other than the specified object to be controlled to the specified object to be controlled by the controlled-object selecting switch, and after the adjustment-value changing operation unit indicates the pre-switching adjustment value, transmitting the adjustment-value changing command to the specified object to be controlled, and thereby make the specified object to be controlled adjust the adjustment amount to the one indicated by the adjustment value.

DETAILED DESCRIPTION

First Embodiment

Figure 1:
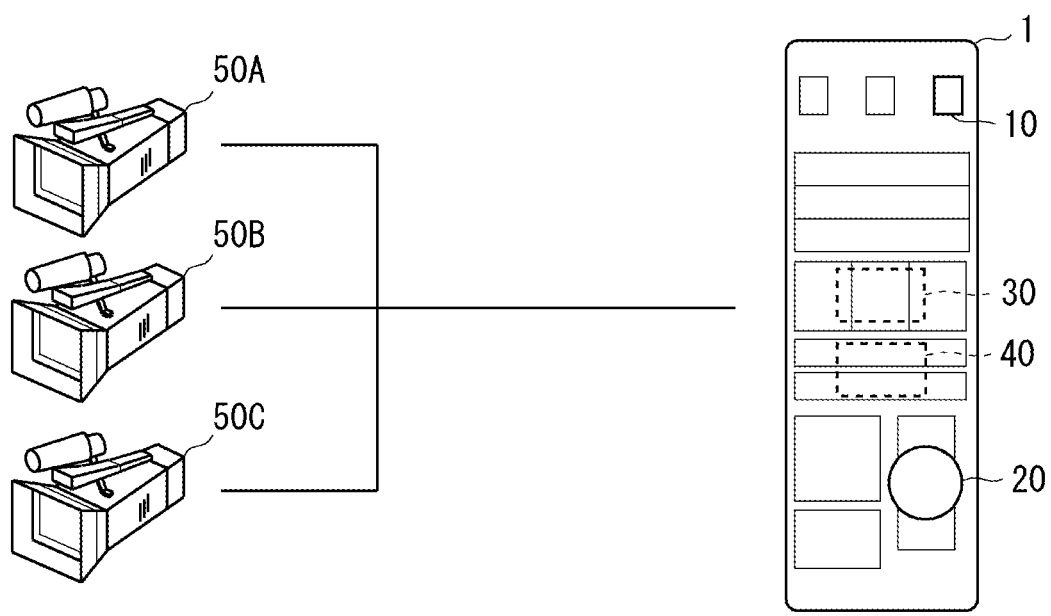
FIG. 1 shows an example of a control system according to a first embodiment.

FIG. 1 shows an example of a configuration of a control system according to an embodiment. The control system includes one control apparatus 1 and a plurality of objects to be controlled 50A, 50B and 50C. The control apparatus 1 includes a controlled-object selecting switch 10, an adjustment-value changing lever 20, a control unit 30, and a storage unit 40. The control apparatus 1 is an apparatus capable of adjusting adjustment amounts for the plurality of objects to be controlled 50A, 50B and 50C. The objects to be controlled 50A, 50B and 50C are, for example, cameras, and the adjustment amounts thereof are, for example, the brightness or the color tones of images taken by the cameras. Note that the objects to be controlled 50A, 50B and 50C are not limited to cameras as long as they have adjustment amounts to be controlled. That is, the present invention can be applied to other types of apparatuses. Further, the number of objects to be controlled is not limited to three. That is, the number of objects to be controlled is at least two, and may be four or more.

The controlled-object selecting switch 10 selects an object to be controlled from the plurality of objects to be controlled 50A, 50B and 50C and switches the object to be controlled to the selected one. For example, when the controlled-object selecting switch 10 selects the object to be controlled 50A, the object to be controlled 50A is determined as the object to be controlled by the control apparatus 1.

The adjustment-value changing lever 20 is an operation unit for changing an adjustment value indicating an adjustment amount for each of the objects to be controlled, and functions as an adjustment-value changing operation unit according to the present invention. For example, the adjustment-value changing lever 20 changes an adjustment value indicating an adjustment amount for the object to be controlled 50A and also changes an adjustment value indicating an adjustment amount for the object to be controlled 50B. The adjustment value is a value indicated by the adjustment-value changing lever 20 in the control apparatus 1, and is a value determined, for example, based on the angle or the position of the adjustment-value changing lever 20 in the control apparatus 1.

Figure 2A:
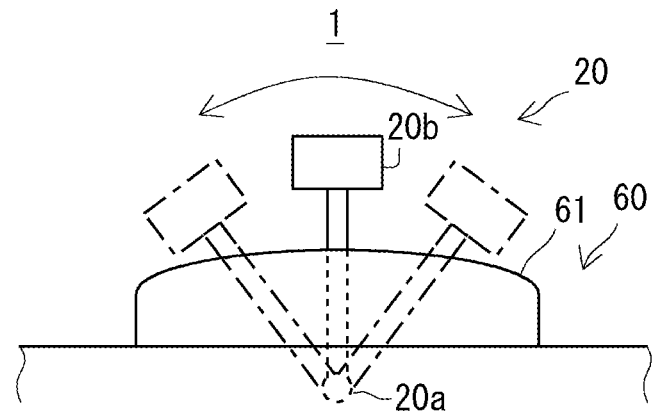
FIG. 2A shows an example of an adjustment-value changing lever of a control apparatus according to the first embodiment, and shows a side view thereof.
Figure 2B:
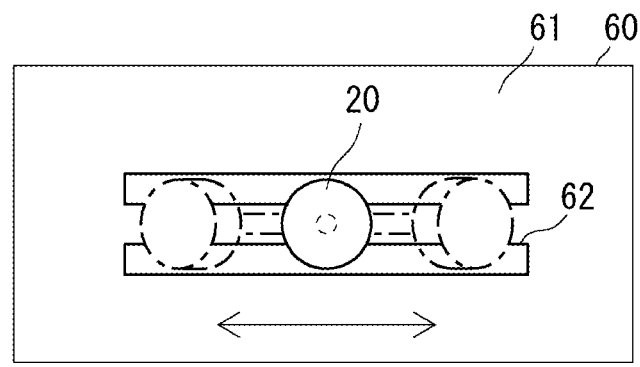
FIG. 2B shows an example of the adjustment-value changing lever of the control apparatus according to the first embodiment, and shows a plan view thereof.

FIGS. 2A and 2B show an example of the adjustment-value changing lever of the control apparatus according to the first embodiment. In particular, FIG. 2A shows its side view and FIG. 2B shows its plan view. As shown in FIGS. 2A and 2B, the adjustment-value changing lever 20 is, for example, a stick-like member that rotates around a fulcrum 20a, and is, for example, the so-called iris lever. The adjustment-value changing lever 20 is equipped with a grip part 20b, whose diameter is larger than that of a column part extending from the fulcrum, at an end thereof opposite to the fulcrum 20a. A user grasps the grip part 20b and rotates the adjustment-value changing lever 20 around the fulcrum 20a.

A part of the adjustment-value changing lever 20 including the fulcrum 20a is disposed inside a housing 60 of the control apparatus 1, and a part of the adjustment-value changing lever 20 including the grip part 20b projects from a top surface 61 of the housing 60. The part including the grip part 20b projects from a groove 62 formed in the top surface 61 of the control apparatus 1. The part including the grip part 20b can be moved along the groove 62 as viewed from above.

The adjustment-value changing lever 20 indicates an adjustment value by the angle or the position of the adjustment-value changing lever 20 in the control apparatus 1. The angle or the position of the adjustment-value changing lever 20 in the control apparatus 1 is used as the adjustment value and corresponds to the adjustment amount for the object to be controlled. Therefore, a user adjusts, by changing the adjustment value indicated by the adjustment-value changing lever 20, the adjustment amount for the object to be controlled to the adjustment amount corresponding to the changed adjustment value.

The control unit 30 makes the object to be controlled adjust the adjustment amount. For example, the control unit 30 makes the object to be controlled 50A selected by the controlled-object selecting switch 10 adjust the adjustment amount to the one indicated by the adjustment value changed by the adjustment-value changing lever 20. Specifically, the control unit 30 makes the selected object to be controlled 50A adjust the adjustment amount by transmitting an adjustment-value changing command. The adjustment-value changing command is a signal for adjusting the adjustment amount to the one indicated by the adjustment value of the adjustment-value changing lever 20, and the control unit 30 transmits the adjustment-value changing command to the object to be controlled 50A selected by the controlled-object selecting switch 10. Upon receiving the adjustment-value changing command, the object to be controlled 50A adjusts the adjustment amount to the one indicated by the adjustment value of the adjustment-value changing lever 20.

The storage unit 40 stores the adjustment value adjusted by the adjustment-value changing lever 20. Specifically, the storage unit 40 stores, when the object to be controlled is switched from the object to be controlled 50A to an object to be controlled other than the object to be controlled 50A, e.g., to the object to be controlled 50B by the controlled-object selecting switch 10, a pre-switching adjustment value E1 indicating an adjustment amount M1 before the switching of the object to be controlled 50A. The storage unit 40 is formed, for example, by a memory such as a RAM (Random Access Memory).

When the object to be controlled is switched from the object to be controlled 50A to an object to be controlled other than the object to be controlled 50A, e.g., to the object to be controlled 50B by the controlled-object selecting switch 10, the control unit 30 starts, after the adjustment-value changing lever 20 indicates the pre-switching adjustment value E1, transmitting the adjustment-value changing command to the object to be controlled 50A. In this way, the control unit 30 makes the object to be controlled 50A adjust the adjustment amount to the one indicated by the adjustment value. Therefore, after the adjustment-value changing lever 20 indicates the pre-switching adjustment value E1, the control unit 30 makes the object to be controlled 50A adjust the adjustment amount to the one indicated by the adjustment value so as to follow the change of the adjustment-value changing lever 20.

For example, when the object to be controlled is switched from the object to be controlled 50B to the object to be controlled 50A by the controlled-object selecting switch 10, the position of the adjustment-value changing lever 20 is changed to the position indicating the pre-switching adjustment value E1 by the user. As a result, the control unit 30 starts transmitting the adjustment-value changing command to the object to be controlled 50A. Therefore, after the adjustment-value changing lever 20 indicates the pre-switching adjustment value E1, the control unit 30 makes the object to be controlled 50A adjust the adjustment amount so as to follow the change of the adjustment-value changing lever 20 made by the user. The control unit 30 may be implemented by hardware or by software, and the use of hardware and software is arbitrarily determined.

Figure 3:
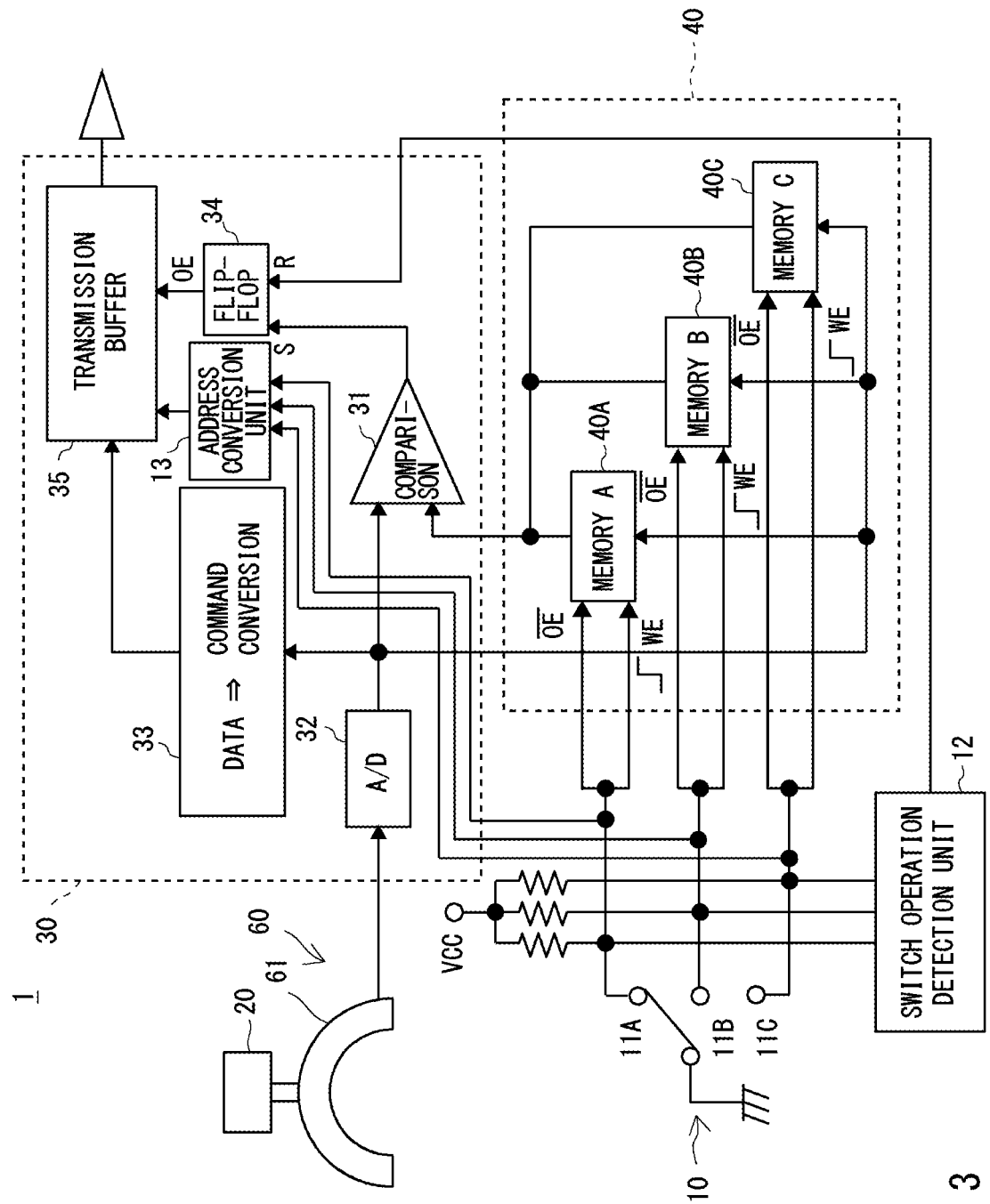
FIG. 3 is a configuration diagram showing an example of the control apparatus according to the first embodiment.

Next, an example of the configuration of the control apparatus according to the first embodiment will be described. FIG. 3 shows an example of the configuration of the control apparatus according to the first embodiment.

As shown in FIG. 3, for example, the control apparatus 1 includes the controlled-object selecting switch 10, the adjustment-value changing lever 20, the control unit 30, and the storage unit 40. The controlled-object selecting switch 10 includes terminals 11A, 11B and 11C for selecting one of the objects to be controlled 50A, 50B and 50C, an address conversion unit 13 that converts a position signal indicating the switch position of the controlled-object selecting switch 10 into a controlled-object address, and a switch operation detection unit 12 that detects switching of the object to be controlled. The output of the switch operation detection unit 12 is connected to an R-terminal of a flip-flop 34. Further, the output of the switch operation detection unit 12 becomes a high level when the switch operation detection unit 12 detects switching of the controlled-object selecting switch 10, and becomes a low level in all other states.

The adjustment-value changing lever 20 changes the adjustment value as a user moves it along the groove 62 formed in the top surface 61 of the housing 60.

The control unit 30 includes a comparison unit 31, an A/D converter 32, a command conversion unit 33, a flip-flop 34, and a transmission buffer 35. The A/D converter 32 converts an analog adjustment value changed by the adjustment-value changing lever 20 into a digital value. The comparison unit 31 compares an adjustment value output from the A/D converter 32 with a pre-switching adjustment value output from the storage unit 40. The output of the comparison unit 31 is connected to an S-terminal of the flip-flop 34. Further, the output of the comparison unit 31 becomes a high level when the adjustment value output from the A/D converter 32 matches the pre-switching adjustment value output from the storage unit 40, and becomes a low level in all other states.

The command conversion unit 33 converts the adjustment value received from the A/D converter 32 into an adjustment-value changing command suitable for the apparatus to be controlled, and sends the adjustment-value changing command to the transmission buffer 35. The transmission buffer 35 transmits the adjustment-value changing command received from the command conversion unit 33 to the object to be controlled selected by the controlled-object selecting switch 10. Specifically, the transmission buffer 35 transmits the adjustment-value changing command when an OE-terminal is at a high level, and does not transmit the adjustment-value changing command when the OE-terminal is at a low level. The level of the OE-terminal of the command conversion unit 33 is switched between a high level and a low level by the flip-flop 34. Further, the destination to which the command is transmitted is determined based on the signal received from the controlled-object selecting switch 10.

Figure 4:
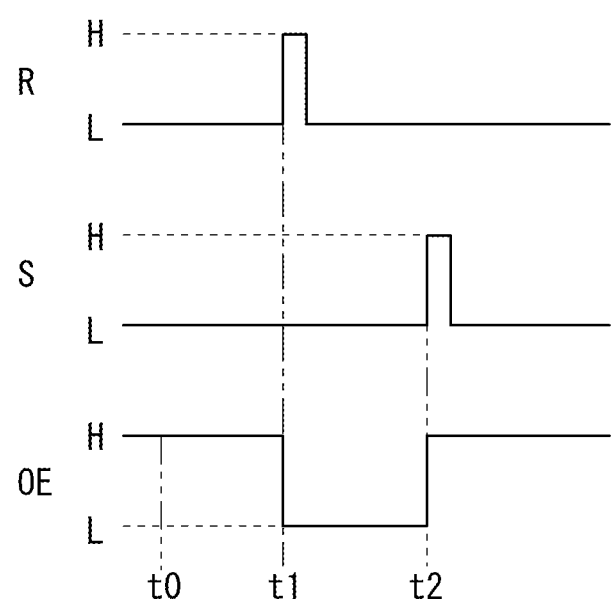
FIG. 4 is a timing chart showing an example of transmission control of a transmission buffer in the control apparatus according to the first embodiment.

Transmission control for the transmission buffer 35 will be described with reference to FIG. 4. At a time to, the OE-terminal of the transmission buffer 35 is at a high level, so that the transmission buffer 35 continues transmitting the adjustment-value changing command. At this point, the adjustment amount for the object to be controlled is adjusted according to the position of the adjustment-value changing lever 20 of the control apparatus 1. When the object to be controlled is switched at a time t1, the output of the switch operation detection unit 12 becomes a high level and the level of the R-terminal of the flip-flop 34 becomes a high level, so that the level of the OE-terminal of the transmission buffer 35 becomes a low level and the transmission buffer 35 stops the transmission of the adjustment-value changing command. In this state, the adjustment amount for the object to be controlled remains unchanged irrespective of the position of the adjustment-value changing lever 20 of the control apparatus 1. After that, the position of the adjustment-value changing lever 20 is moved. Then, at a time t2, when the comparison unit 31 determines that the adjustment value output from the A/D converter 32 becomes equal to the pre-switching adjustment value output from the storage unit 40, the output of the comparison unit 31 becomes a high level and the level of the S-terminal of the flip-flop 34 becomes a high level, so that the level of the OE-terminal of the transmission buffer 35 becomes a high level and the transmission buffer 35 restarts the transmission of the adjustment-value changing command.

The storage unit 40 includes memories 40A, 40B and 40C. The memory 40A receives a write signal WE when the object to be controlled is switched from the object to be controlled 50A to an object to be controlled other than the object to be controlled 50A, and stores the pre-switching adjustment value E1 indicating the adjustment amount M1 that is indicted before the switching of the object to be controlled 50A. Similarly to the operation performed by the memory 40A, the memories 40B and 40C receive a write signal WE when the object to be controlled is switched from the objects to be controlled 50B and 50C, respectively, to an object to be controlled other than the objects to be controlled 50B and 50C, respectively, and stores pre-switching adjustment values E2 and E3, respectively, indicating adjustment amounts M2 and M3, respectively, that are indicated before the switching of the objects to be controlled 50B and 50C, respectively.

Further, when the object to be controlled is switched from an object to be controlled other than the object to be controlled 50A to the object to be controlled 50A, the memory 40A receives an output signal OE and outputs the stored pre-switching adjustment value E1 to the comparison unit 31 of the control unit 30. Similarly to the operation performed by the memory 40A, when the object to be controlled is switched from an object to be controlled other than the objects to be controlled 50B and 50C to the objects to be controlled 50B and 50C, the memories 40B, and 40C receive an output signal OE and output the stored pre-switching adjustment values E2 and E3, respectively, to the comparison unit 31 of the control unit 30.

By the above-described configuration, when the object to be controlled is switched from an object to be controlled other than the object to be controlled 50A to the object to be controlled 50A by the controlled-object selecting switch 10, the control unit 30 compares the adjustment value of the adjustment-value changing lever 20 with the pre-switching adjustment value E1 stored in the memory 40A by using the comparison unit 31. Then, as a result of the comparison, after they match each other, i.e., after the adjustment-value changing lever 20 indicates the pre-switching adjustment value E1, the control unit 30 transmits the adjustment-value changing command to the object to be controlled 50A, and thereby makes the object to be controlled 50A adjust the adjustment amount to the one indicated by the adjustment value. The above-described operations performed by the control unit 30 apply to those performed by the objects to be controlled 50B and 50C.

Figure 5:
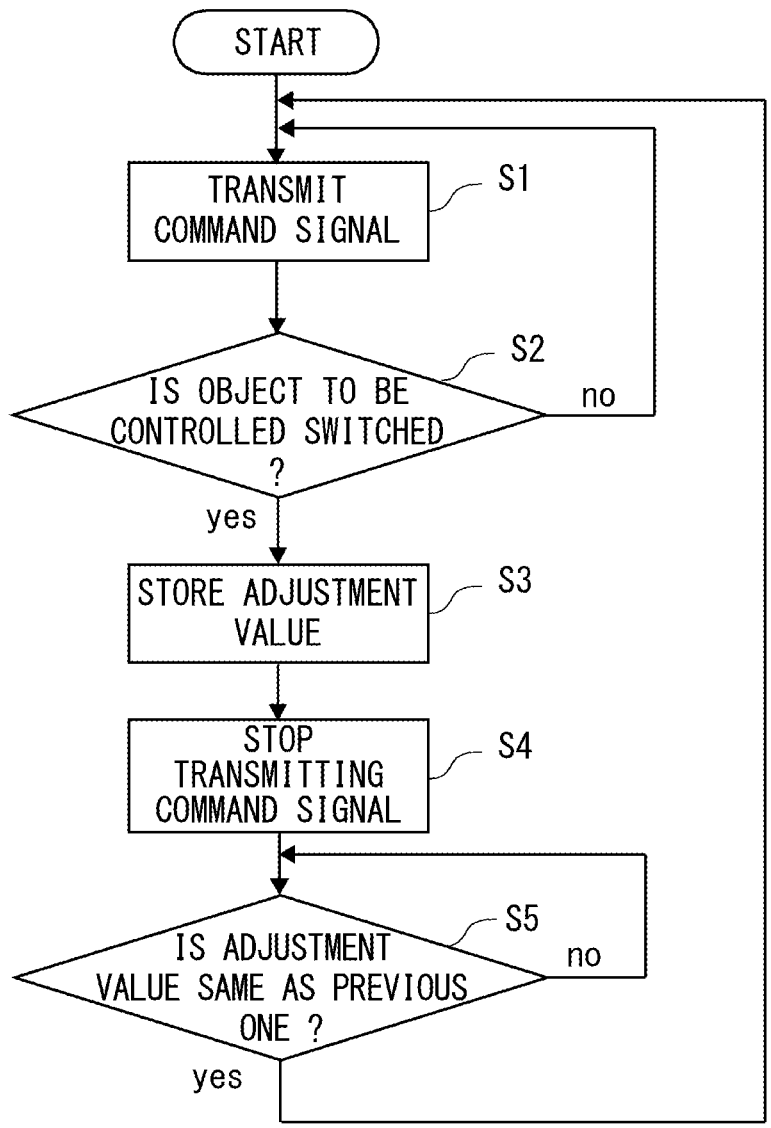
FIG. 5 is a flowchart showing an example of a control method according to the first embodiment.

Next, operations performed by the control apparatus 1 will be described. FIG. 5 is a flowchart showing an example of a control method according to the first embodiment. In a step S1, the transmission buffer 35 transmits a command signal based on the adjustment value of the adjustment-value changing lever 20 to the object to be controlled. In a step S2, the switch operation detection unit 12 determines whether or not the object to be controlled has been switched. When the object to be controlled has not been switched (S2/no), the process returns to the step S1, and the transmission of the command signal based on the adjustment value of the adjustment-value changing lever 20 is repeated. When the object to be controlled has been switched (S2/yes), the storage unit 40 stores, in a step S3, the adjustment value of the adjustment-value changing lever 20 at the time of the switching of the object to be controlled as the pre-switching adjustment value in the object to be controlled that had been selected before the switching.

In a step S4, the transmission buffer 35 stops the transmission of the command. In a step S5, the comparison unit 31 determines whether or not the adjustment value of the adjustment-value changing lever 20 matches the pre-switching adjustment value in the newly-selected object to be controlled. When they do not match each other (S5/no), the step S5 is repeated until they match each other. When they match each other (S5/yes), the process proceeds to the step S1, in which the control unit 30 transmits the command. After that, the step S1 and the subsequent steps are repeated.

Next, advantageous effects of this embodiment will be described. In this embodiment, when the object to be controlled is switched from an object to be controlled other than the object to be controlled 50A to the object to be controlled 50A by the controlled-object selecting switch 10, the control apparatus 1 starts, after the adjustment-value changing lever 20 indicates a pre-switching adjustment value E1, transmitting an adjustment-value changing command to the object to be controlled 50A. In this way, the control apparatus 1 makes the object to be controlled 50A adjust the adjustment amount to the one indicated by the adjustment value. Therefore, even when the object to be controlled is switched, any change, which would otherwise be caused due to the difference in the adjustment value, does not occur. Therefore, it is possible to prevent the adjustment amount from being changed at the time when the object to be controlled is switched.

Further, the adjustment-value changing lever 20 is a stick-like iris lever that rotates around the fulcrum. Therefore, it is possible to change the adjustment value according to user's preference by using the "lever".

Second Embodiment

Figure 6:
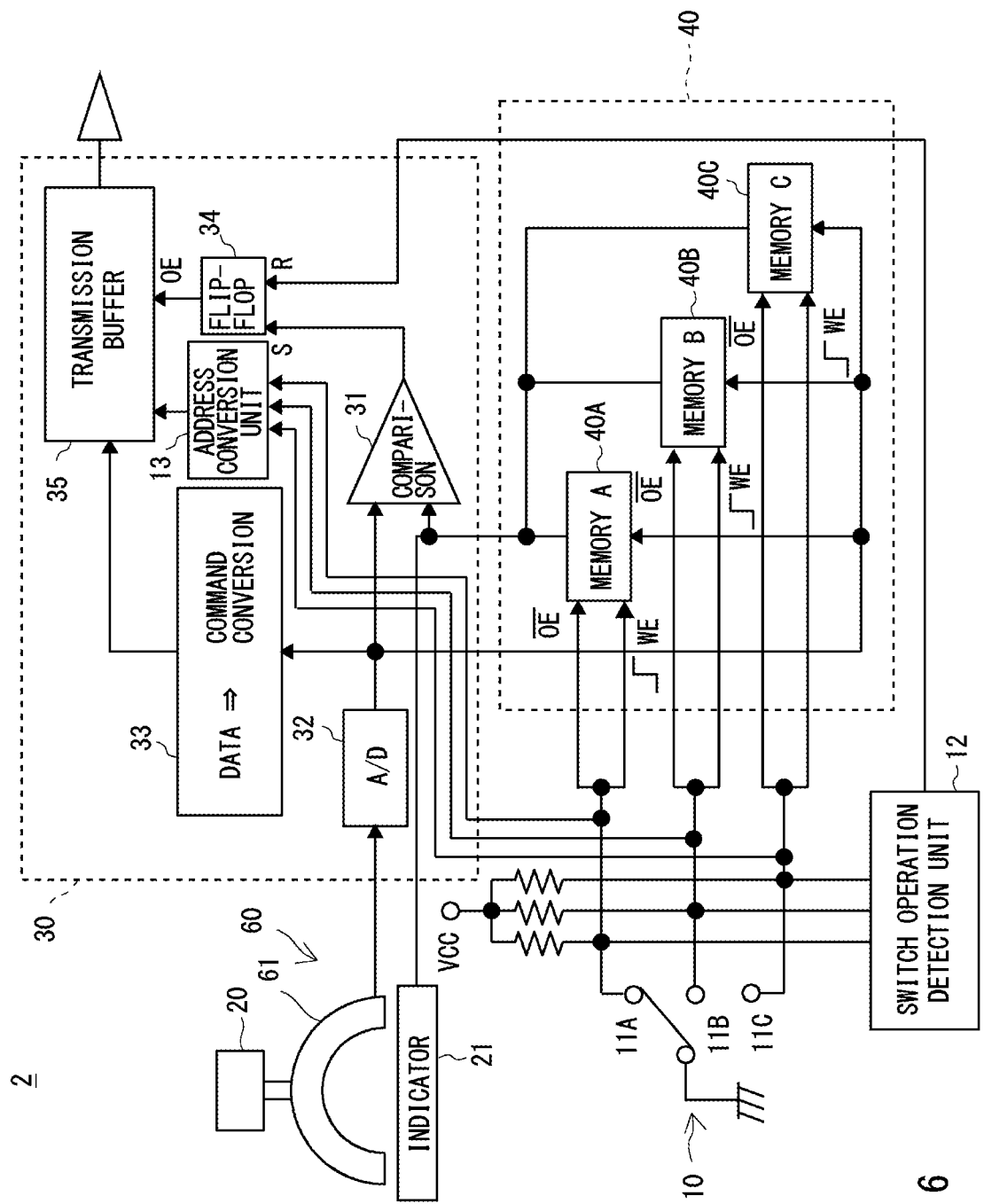
FIG. 6 is a configuration diagram showing an example of a control apparatus according to a second embodiment.
Figure 7A:
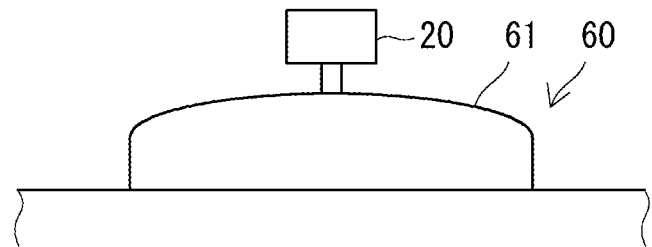
FIG. 7A shows an example of an adjustment-value changing lever and an indicator of the control apparatus according to the second embodiment, and shows a side view thereof.
Figure 7B:
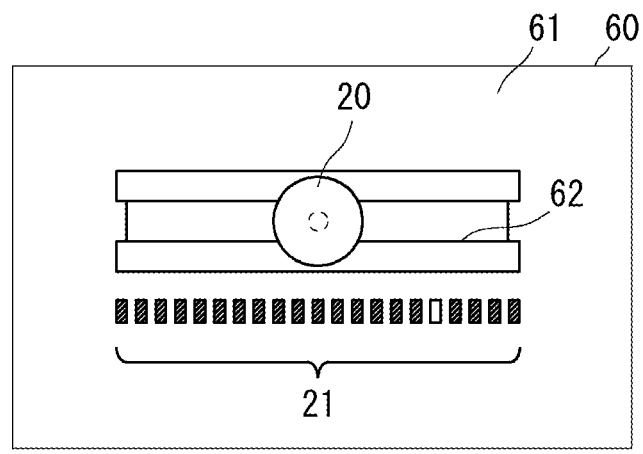
FIG. 7B shows an example of the adjustment-value changing lever and the indicator of the control apparatus according to the second embodiment, and shows a plan view thereof.

Next, a second embodiment will be described. FIG. 6 shows an example of a configuration of a control apparatus 2 according to the second embodiment. Compared to the control apparatus 1 according to the first embodiment, the control apparatus 2 further includes an indicator 21 that indicates the position of the adjustment-value changing lever 20 indicating the pre-switching adjustment value E1. The configuration according to the second embodiment will be described hereinafter with a particular emphasis on the differences from that of the first embodiment. The same components as those in the first embodiment are denoted by the same reference numerals (or symbols), and the descriptions thereof may be omitted. FIGS. 7A and 7B show an example of the adjustment-value changing lever and the indicator of the control apparatus according to the second embodiment. In particular, FIG. 7A shows their side view and FIG. 7B shows their plan view.

As shown in FIGS. 7A and 7B, the control apparatus 2 according to this embodiment includes the indicator 21. The indicator 21 is disposed on the top surface 61 of the housing 60 of the control apparatus 2. Elements constituting the indicator 21 are arranged side by side in the moving direction of the adjustment-value changing lever 20 along the groove 62 therefor in the plan view of the control apparatus 2. For example, as viewed from above, in the indicator 21, a plurality of lamps are arranged side by side in the moving direction of the adjustment-value changing lever 20 next to the adjustment-value changing lever 20. Further, the indicator 21 indicates a lever position according to which an adjustment should be made. Specifically, when the object to be controlled is switched, a lamp located at a position indicating the adjustment position of the adjustment-value changing lever 20 corresponding to the pre-switching adjustment value for the object to be controlled that had been selected before the switching is lit up.

In FIG. 7B, the fifth lamp from the right is in a lit-up state. That is, when the object to be controlled is switched from an object to be controlled other than the object to be controlled 50A to the object to be controlled 50A by the controlled-object selecting switch 10, the adjustment value that should be indicated by the adjustment-value changing lever 20, i.e., the pre-switching adjustment value E1 of the object to be controlled 50A is indicated by the fifth lamp. Therefore, after the adjustment-value changing lever 20 is changed to the pre-switching adjustment value E1 indicated by the fifth lamp, the control unit 30 starts transmitting the adjustment-value changing command to the object to be controlled 50A. In this way, the control unit 30 makes the object to be controlled 50A adjust the adjustment amount to the one indicated by the adjustment value.

Figure 7C:
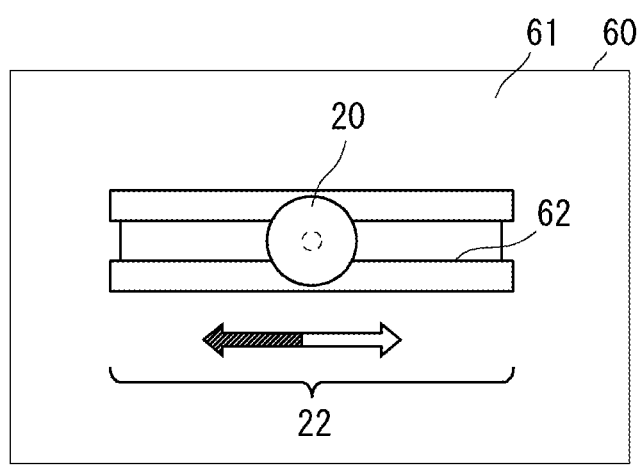
FIG. 7C shows a plan view of another indicator of the control apparatus according to the second embodiment.

The indicator is not limited to the above-described example. That is, the indicator may be any component or the like that indicates the adjustment position of the adjustment-value changing lever 20. FIG. 7C shows an example of another indicator 22. In the indicator 22, a lamp having an arrow-like shape indicates a direction in which the lever should be moved. In FIG. 7C, the arrow-shaped lamp on the right side is lit up, indicating that the adjustment value can be changed to the pre-switching adjustment value E1 by moving the adjustment-value changing lever 20 to the right. By being equipped with the indicator 21 or 22, a user can easily recognize the direction in which he/she should move the adjustment-value changing lever 20.

Next, advantageous effects of this embodiment will be described.

The control apparatus 2 according to this embodiment further includes the indicator indicating the position of the adjustment-value changing lever 20 indicating the pre-switching adjustment value E1. In this way, a user can immediately move the adjustment-value changing lever 20 to the pre-switching adjustment value E1. Therefore, it is possible to make the control unit 30 start transmitting the adjustment-value changing command more quickly, and thereby to make the object to be controlled 50A adjust the adjustment amount more quickly. The rest of the configuration and the advantageous effects are already described above in the description of the first embodiment.

A control program for causing a computer to execute the control method described in the first and second embodiments is also within the scope of the technical idea according to this embodiment.

In the first and second embodiments, examples in which the adjustment-value changing lever 20 is used as the adjustment-value changing operation unit are described. However, the adjustment-value changing operation unit is not limited to the levers. For example, a sliding switch or the like may be used as the adjustment-value changing operation unit.

The present invention can be suitably applied to a control apparatus mounted to a camera or the like.

According to the embodiment, it is possible to provide a control apparatus, a control method, and a control program capable of preventing an adjustment amount from being changed at the time when an object to be controlled is switched.

What is claimed is:

1. A control apparatus comprising:
    a controlled-object selecting switch configured to select a specified object to be controlled from a plurality of objects to be controlled and switch the object to be controlled to the selected one;
    an adjustment-value changing operation unit configured to change an adjustment value indicating an adjustment amount for each of the plurality of objects to be controlled;
    a control unit configured to make the selected specified object to be controlled adjust the adjustment amount by transmitting, to the selected specified object to be controlled, an adjustment-value changing command for adjusting the adjustment amount to the one indicated by the adjustment value;
    a storage unit configured to store, when the object to be controlled is switched from the specified object to be controlled to an object to be controlled other than the specified object to be controlled by the controlled-object selecting switch, a pre-switching adjustment value indicating the adjustment amount before the switching of the specified object to be controlled; and
    an indicator configured to indicate a position of the adjustment-value changing operation unit indicating the pre-switching adjustment value,
    wherein the adjustment-value changing operation unit includes an adjustment-value changing lever that moves along a groove formed in a top surface of a housing,
    wherein the indicator includes a plurality of lamps arranged side by side in a moving direction of the adjustment-value changing lever along the groove, and
    wherein, when the object to be controlled is switched from the object to be controlled other than the specified object to be controlled to the specified object to be controlled by the controlled-object selecting switch, the control unit starts, after the adjustment-value changing operation unit indicates the pre-switching adjustment value by lighting a lamp of the indicator located at a position indicating the adjustment position of the adjustment-value, transmitting the adjustment-value changing command to the specified object to be controlled, and thereby makes the specified object to be controlled adjust the adjustment amount to the one indicated by the adjustment value.

2. The control apparatus according to claim 1, wherein when the object to be controlled is switched from an object to be controlled other than the specified object to be controlled to the specified object to be controlled by the controlled-object selecting switch, a position of the adjustment-value changing operation unit is changed to a position indicating the pre-switching adjustment value by a user.

3. The control apparatus according to claim 1, wherein the adjustment-value changing operation unit is a stick-like member configured to rotate around a fulcrum.

4. A control method comprising:
    a step of selecting, by using a controlled-object selecting switch configured to select a specified object to be controlled from a plurality of objects to be controlled and switch the object to be controlled to the selected one, the specified object to be controlled and switching the object to be controlled to the selected one;

a step of changing, by using an adjustment-value changing operation unit configured to change an adjustment value indicating an adjustment amount for each of the plurality of objects to be controlled, the adjustment value indicating the adjustment amount for the specified object to be controlled;

a step of making the selected specified object to be controlled adjust the adjustment amount by transmitting, to the selected specified object to be controlled, an adjustment-value changing command for adjusting the adjustment amount to the one indicated by the adjustment value;

a step of storing, when the object to be controlled is switched from the specified object to be controlled to an object to be controlled other than the specified object to be controlled by the controlled-object selecting switch, a pre-switching adjustment value indicating the adjustment amount before the switching of the specified object to be controlled;

a step of indicating a position of the adjustment-value changing operation unit indicating the pre-switching adjustment value; and a step of starting, when the object to be controlled is switched from the object to be controlled other than the specified object to be controlled to the specified object to be controlled by the controlled-object selecting switch, and after the adjustment-value changing operation unit indicates the pre-switching adjustment value by lighting a lamp of the indicator located at a position indicating the adjustment position of the adjustment-value, transmitting the adjustment-value changing command to the specified object to be controlled, and thereby making the specified object to be controlled adjust the adjustment amount to the one indicated by the adjustment value, wherein the adjustment-value changing operation unit includes an adjustment-value changing lever that moves along a groove formed in a top surface of a housing, and wherein the indicator includes a plurality of lamps arranged side by side in a moving direction of the adjustment-value changing lever along the groove.

5. A non-transitory computer readable medium storing a control program for causing a computer to, when a specified object to be controlled is selected and the object to be controlled is switched to the selected one by a controlled-object selecting switch configured to select the specified object to be controlled from a plurality of objects to be controlled and switch the object to be controlled to the selected one, and an adjustment value indicating an adjustment amount for the specified object to be controlled is changed by an adjustment-value changing operation unit configured to change the adjustment value indicating the adjustment amount for each of the plurality of objects to be controlled, make the selected specified object to be controlled adjust the adjustment amount by transmitting, to the selected specified object to be controlled, an adjustment-value changing command for adjusting the adjustment amount to the one indicated by the adjustment value;

store, when the object to be controlled is switched from the specified object to be controlled to an object to be controlled other than the specified object to be controlled by the controlled-object selecting switch, a pre-switching adjustment value indicating the adjustment amount before the switching of the specified object to be controlled;

indicate a position of the adjustment-value changing operation unit indicating the pre-switching adjustment value; and start, when the object to be controlled is switched from the object to be controlled other than the specified object to be controlled to the specified object to be controlled by the controlled-object selecting switch, and after the adjustment-value changing operation unit indicates the pre-switching adjustment value by lighting a lamp of the indicator located at a position indicating the adjustment position of the adjustment-value, transmitting the adjustment-value changing command to the specified object to be controlled, and thereby make the specified object to be controlled adjust the adjustment amount to the one indicated by the adjustment value, wherein the adjustment-value changing operation unit includes an adjustment-value changing lever that moves along a groove formed in a top surface of a housing, wherein the indicator includes a plurality of lamps arranged side by side in a moving direction of the adjustment-value changing lever along the groove.

* * * * *